United States Patent
Keal

(10) Patent No.: US 10,764,717 B1
(45) Date of Patent: Sep. 1, 2020

(54) LOCATION DETERMINATION OF MOBILE DEVICES

(71) Applicant: enLighted, Inc., Sunnyvale, CA (US)

(72) Inventor: William Kerry Keal, San Jose, CA (US)

(73) Assignee: Enlighted, Inc., Sunnyvale, CA (US)

( * ) Notice: Subject to any disclaimer, the term of this patent is extended or adjusted under 35 U.S.C. 154(b) by 0 days.

(21) Appl. No.: 16/534,591

(22) Filed: Aug. 7, 2019

(51) Int. Cl.
*H04W 4/38* (2018.01)
*H04W 4/02* (2018.01)
*H04W 4/029* (2018.01)
*G01S 5/00* (2006.01)
*H04W 64/00* (2009.01)
*H04W 4/33* (2018.01)

(52) U.S. Cl.
CPC .......... *H04W 4/023* (2013.01); *G01S 5/0027* (2013.01); *H04W 4/029* (2018.02); *H04W 4/33* (2018.02); *H04W 4/38* (2018.02); *H04W 64/003* (2013.01)

(58) Field of Classification Search
CPC ......... H04W 4/38; H04W 4/33; H04W 4/029; H04W 64/003
See application file for complete search history.

(56) References Cited

U.S. PATENT DOCUMENTS

| | | | |
|---|---|---|---|
| 9,080,883 B2 | 7/2015 | Frey | |
| 9,585,227 B2 | 2/2017 | Mohan et al. | |
| 9,872,271 B2 | 1/2018 | Ericsson et al. | |
| 10,117,308 B2 | 10/2018 | Patel et al. | |
| 10,182,487 B2 | 1/2019 | Mohan et al. | |
| 2007/0236389 A1* | 10/2007 | Lommen | G01S 5/021 342/386 |
| 2017/0092109 A1* | 3/2017 | Trundle | B64D 47/04 |
| 2017/0322119 A1* | 11/2017 | Da Silva | G01M 99/00 |
| 2018/0308029 A1 | 10/2018 | Loffler et al. | |
| 2018/0328737 A1 | 11/2018 | Frey et al. | |
| 2019/0007809 A1 | 1/2019 | Frey et al. | |
| 2019/0043328 A1* | 2/2019 | Thomas | G08B 13/2402 |
| 2019/0104383 A1 | 4/2019 | Keal | |

* cited by examiner

*Primary Examiner* — Sam Bhattacharya

(57) ABSTRACT

There is described a location determining system comprising multiple mobile devices and multiple sensors at a facility as well as a sensor hub communicating directly or indirectly with the sensors. The sensors receive from the mobile devices broadcast beacons and identify measured times associated with receipt of the broadcast beacons from the mobile devices. The sensor hub stores the locations of sensors receives the measured times from the sensors. The sensor hub also determines sensor time errors based on the measured times, the locations of the sensors, and a transmission velocity associated with the broadcast beacons. The location determining system determines locations of the mobile devices based at least in part on the sensor time errors.

18 Claims, 6 Drawing Sheets

LOCATION DETERMINATION OF MOBILE DEVICES

FIELD OF THE INVENTION

This application relates to the field of location determination of mobile devices and, more particularly, to a system for determining at location of a mobile device within an indoor facility.

BACKGROUND

Building management systems encompass a wide variety of systems that aid in the monitoring and control of various aspects of building operation. Building management systems (which may also be referred to herein as "building control systems") include security systems, fire safety systems, lighting systems, and heating, ventilation, and air conditioning ("HVAC") systems. HVAC systems are sometimes referred to as "environment control systems" because these systems control the environmental conditions within the building. A single building may include multiple building management subsystems (e.g., a security system, a fire system and an environmental control system). Multiple building management systems may be arranged separately from one another or as a single system with multiple subsystems that are controlled by a common control station or server. The common control station or server may be contained within the building or remote from the building, depending upon the implementation.

Intelligent building control provides for control of the building that is user intelligent. That is, based on behavior or predicted behavior of users within the building, the intelligent building control provides the users with intelligent environmental controls, safety controls, logistical, and/or information control. Such user behavior may include the location of people within particular areas of a building, which may be utilized by the building management system to enhance control of the environmental conditions of the building. For example, the system may position motion sensors throughout a building to track occupant activity and deliver timing data corresponding to the detected motion to a central server. The central server will need precise timing data in order to track people accurately.

Some sensors of building management systems do not provide precise timing data. Each motion sensor may include an on-board clock but the clock of one motion sensor may be misaligned in time relative to another motion sensor of the system. Existing systems may address the misalignment in time of motion sensors, but they do so at the expense of added cost and/or insufficient precision. For example, the time of an on-board clock for a particular sensor may be set periodically through a broadcast message provided to the sensor or an external tool but additional components and complexity are added to the system. For another example, the central server may store the time when timing data is received as well as the sensor time, but errors in transmit timing may still exist. Thus, motion sensors of existing systems rely on timing data that lack precision and synchronization with the timing data of other sensors of the system.

SUMMARY

In accordance with one embodiment of the disclosure, there is provided a location determination approach for building management systems. In particular, the systems and methods described herein determine locations of mobile devices at a facility and manage one or more environmental conditions of the facility based, at least in part, on the mobile device locations. In particular, the system determines the locations of the mobile devices based on time of flight of over-the-air beacons broadcast by the mobile devices to sensors positioned at known locations of the facility. A sensor hub, communicating directly or indirectly with the sensors, collects the information from the sensors, whether received and/or determined by the sensors, and determines the locations for the mobile devices. It is important to note that the sensor hub of the system compensates for any sensor time errors of the of timing components (e.g., clocks) of the sensors in order to maximize the accuracy of determining the mobile device locations.

One aspect is a location determining system comprising multiple mobile devices, multiple sensors having locations at a facility, and a sensor hub communicating directly or indirectly with the sensors. The sensors receive from the mobile devices broadcast beacons and identify measured times associated with receipt of the broadcast beacons from the mobile devices. The sensor hub stores the locations of sensors and receives the measured times from the sensors. The sensor hub also determines sensor time errors based on the measured times, the locations of the sensors, and a transmission velocity associated with the broadcast beacons.

Another aspect is a method for a location determining system that includes multiple mobile devices, multiple sensors, and a sensor hub. The sensor hub stores locations of multiple sensors located at a facility. The sensors receive broadcast beacons from multiple mobile devices. The sensors identify measured times associated with receipt of the broadcast beacons by the sensors. The sensor hub receives the measured times from the sensors. The sensor hub determines sensor time errors based on the measured times, the location of the sensors, and a transmission velocity associated with the broadcast beacons.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
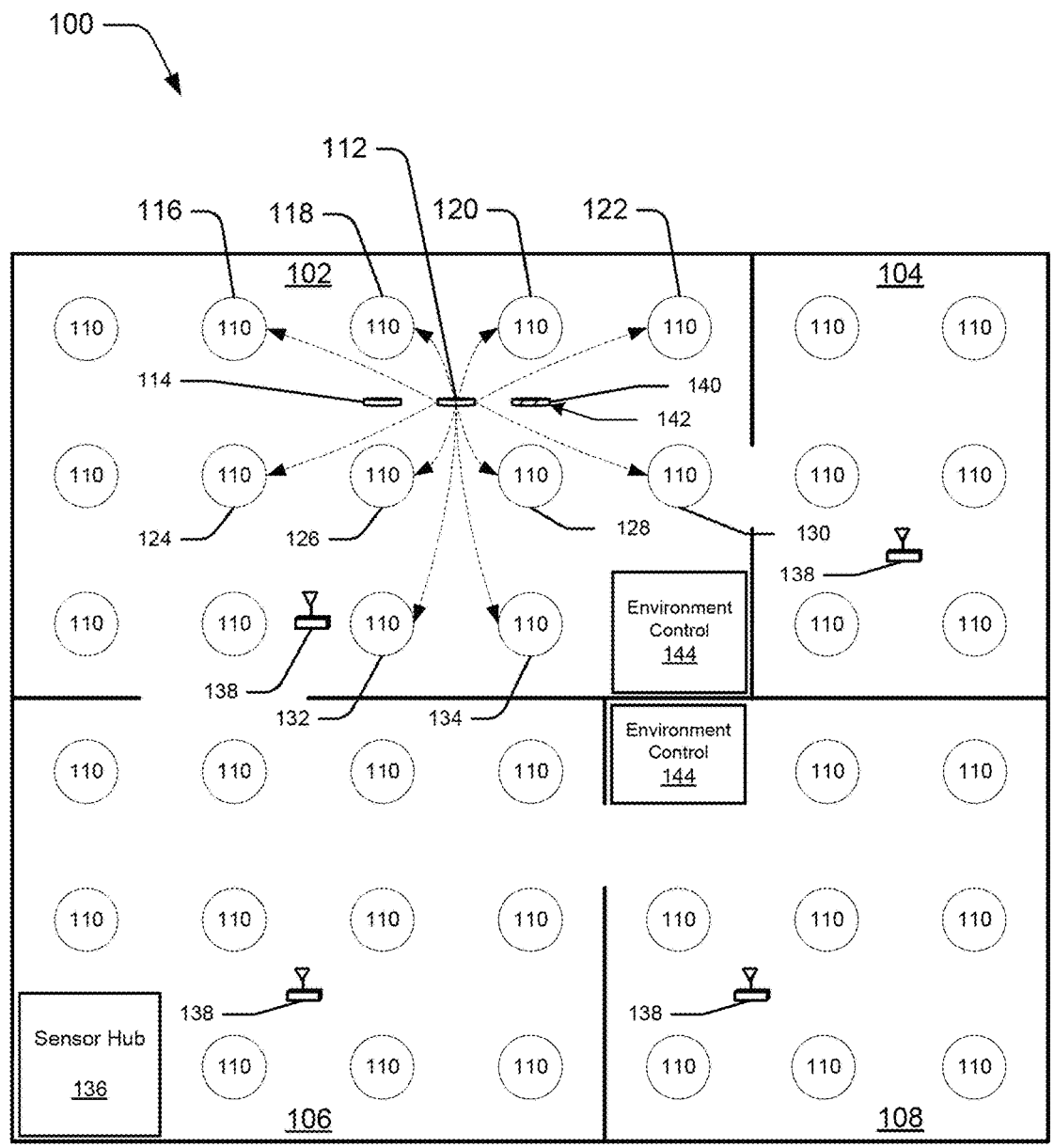
FIG. 1 is an overhead map view of an environment including an example implementation of a system that is operable to employ techniques described herein.

Various technologies that pertain to systems and methods that facilitate sensor timing correction for user location determination will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The location determining system provides information to an environment control system of the facility so that the environment control system may manage one or more environmental conditions of the facility. The system may manage the environmental conditions based at least in part on the locations of mobile devices. The location determining system 100 may determine the location of an occupant by utilizing time of flight between the occupant and multiple known locations of the facility. In particular, time of flight may be determined from the distance and transmission velocity between the occupant and multiple known locations of the facility. The transmission velocity may be a constant value based on a general speed of electromagnetic radiation of a radio frequency wave, speed of light, or speed of sound.

In determining the location of an occupant based on time of flight, the location determining system synchronizes the timing of the devices utilized for the determination. Embodiments may include mobile device to be carried by occupants to provide information about the occupants and sensors positioned at fixed locations of the facility to provide information about those particular locations. The timing component of each mobile device may be calibrated and controlled to provide accurate clock time, but the timing component of each sensor may be more difficult to calibrate and control. For this reason, a central device or server, such as a sensor hub, may collect the information received and/or determined by the sensors and determine locations for the mobile devices after compensating for any sensor time error of the sensors.

Referring to FIG. 1, the location determining system 100 establishes a location of one or more mobile devices within a facility, such as an indoor structure or defined space. The facility may include various partitioned or designated areas 102-108 of the facility, such as floors, rooms, hallways, or defined open areas associated with the facility. Each area 102-108 of the facility may include one or more sensors 110 positioned at fixed locations throughout the area. The sensors 110 may be evenly distributed throughout each area 102-108 or selectively distributed in a non-even manner, as may be preferred for mobile device detection.

The sensors 110 are configured to detect beacons broadcast by one or more sources associated with positions of occupants. In particular, occupants may carry mobile devices 112, 114 for detection by the sensors 110, among other purposes, to facilitate location detection of the devices. Each of the mobile devices 112, 114 may be any type of transportable device capable of wireless communication with sensors 110 of the facility. Examples of mobile devices include, but are not limited to, tags, wearables, wireless communication devices, tablets, portable computing devices, and any other type of transportable device including circuitry for transmitting a beacon. Wireless communication technologies that may be used to transmit the beacon include, but are not limited to, Bluetooth (including BLE), Wi-Fi (including Wi-Fi Direct), Zigbee, Z-Wave, 6LoW-PAN, Near-Field Communication, other types of electromagnetic radiation of a radio frequency wave, light-based communications (including infrared), acoustic communications, and any other type of peer-to-peer technology, may be utilized for implementing the techniques described herein.

A mobile device 112 may broadcast a beacon to sensors 116-134 in proximity to the device. For the example shown in FIG. 1, the broadcast beacon transmitted by the mobile device 112 may be received by the sensors 118, 120, 126, 128 located closest to the device. Also, for this example, the broadcast beacon may be received by other sensors 116, 122, 124, 130-134, in addition to the closest sensors 118, 120, 126, 128, in proximity to the mobile device 112. The broadcast range of the mobile device 112 for transmitting the broadcast beacon may be limited by the capabilities of the device, such as power and energy storage, as well as the proximity of the device to the sensors 110 in view of distance and any obstructions therebetween. Also, a plurality of mobile devices, such as mobile devices 112, 114, shown in FIG. 1, may transmit broadcast beacons to the sensors 110, including the sensors 116-134 in proximity to the devices.

Each mobile device 112 may transmit a broadcast beacon in response to signals received from one or more components of the device. For example, the mobile device 112 may transmit the broadcast beacon in response to a periodic signal from a timing circuit, an activity signal from a motion sensor, an environment signal from an environmental sensor, an external signal from a communication component, or a combination of factors based on information received from more than one component. The signals received from the other component(s) may established in order to conserve energy, enhance performance, or serve other purposes for the mobile device 112.

In addition to the sensors 110 and the mobile devices 112, 114, the location determining system 100 further includes one or more sensor hubs 136. The sensor hub 136 communicates directly or indirectly with the sensors 110 and the interconnection between the sensor hub 136 and the sensors may include wired and/or wireless connections. For example, the location determining system 100 may optionally include wired or wireless gateways 138 positioned among the sensors 110 at the facility in which the wired or wireless gateways may serve as a communication transponder between the sensor hub 138 and the sensors. Also, the sensor hub 136 may be co-located with some or all sensors at a facility or the sensor hub may be located remote from the sensors and/or remote from the facility. For example, the sensor hub 136 may be located in the Cloud and communicate directly or indirectly with the sensors 110, at least in part, via the Internet or other communication network.

The mobile devices of the location determining system 100 may include one or more unattended mobile devices 140 positioned at a particular location 142 of the facility. An unattended mobile device 140 is a considered to be one of the mobile devices 112, 114, 140 of the location determining system 100. However, each of the other "attended" mobile devices 112, 114 is associated with a particular occupant whereas the unattended mobile device 140 is not associated with, thus not attended by, any particular occupant. Since the locations of occupants are of particular interest to the location determining system 100, the sensor time error and the location of the attended mobile device(s) 112, 114 are determined by the sensor hub 136. On the other hand, the sensor time error and the location of the unattended mobile device 140 only needs to be determined to the extent that it assists the sensor hub 136 to determine the information for the attended mobile device(s). The unattended mobile device 140 may facilitate or otherwise assist the sensor hub 136 to determine the sensor time error for a proximal sensor 116-134 or the location of an attended mobile device 112, 114 by having a particular location 142 in proximity to the same or similar proximal sensors 116-134 as the attended mobile device 112, 114. As explained below, the sensor hub 136 needs information from a plurality of mobile devices in order to determine sensor time error and the location of the mobile device For at least some embodiments, the location determining system 100 may manage one or more environment control systems 144 associated with the facility based on the determined locations of the mobile devices. In particular, the sensor hub 136 may provide a control signal to an environment control system 144 of the facility via a wired connection, wireless connection, or a combination of wired and wireless connections. The environment control system 144 may manages an environmental condition of the facility based, in whole or in part, on the locations corresponding to the mobile devices, namely the attended mobile devices 112, 114. Environmental conditions managed by the environment control system 144 include, but are not limited to, heating ventilation air conditioning ("HVAC") conditions, lighting conditions, safety conditions, and security conditions. For example, areas of the facility where occupants are not detected may have lights dimmed or inactivated. Also, an HVAC system associated with a particular area may adjust ambient temperatures based on the occupancy and/or location of occupants as detected by the location determining system 100.

Figure 2:
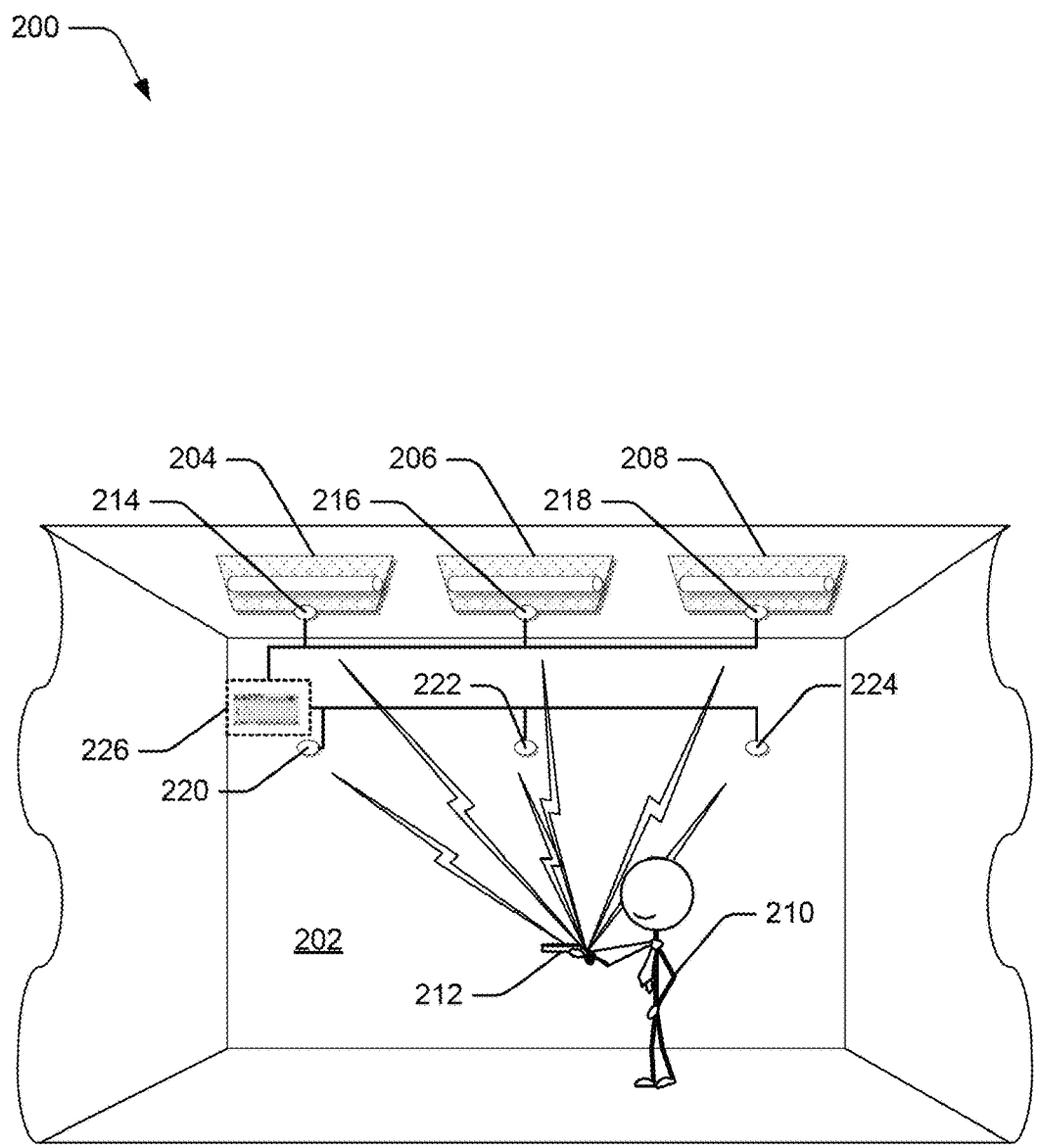
FIG. 2 is a cut-away, side planar view of an example area illustrating an aspect of the system described herein, particularly from the view of a user.

Referring to FIG. 2, there is shown an example implementation 200 as applied to an area 202 of the facility to illustrate an aspect of the location determining system 100. For this example implementation 200, environmental devices, such as light fixtures 204-208, are installed at ceiling of the area 202. Examples of environmental devices include, but are not limited to, light fixtures 204-208, air vents, window blinds/shades, smoke detectors, security cameras, and the like. The example implementation 200 also shows an occupant 210 of the facility and a mobile device 212 associated with the occupant. For example, the mobile device 212 may be carried, supported, or otherwise co-located with the occupant 210 such that the location of the mobile device may be associated with the location of the occupant.

In addition to the environmental devices, the area 202 includes sensors 214-224 positioned at various locations of the area. For example, as shown in FIG. 1, some sensors 214-218 may be fixed or otherwise positioned at a ceiling of the area 202, and other sensors 220-224 may be fixed or otherwise positioned at a wall of the area. Also, sensors 214-218 may be co-located or adjacent to environmental devices and/or sensors 220-224 may be positioned independent of the environmental devices. The location determining system 100 may optionally include one or more wired or wireless gateways 226 positioned among the sensors 110 at the facility in which each wired or wireless gateways may serve as a communication transponder between the sensor hub 138 and select sensors. The sensors 214-224 having locations at the ceiling, walls, and other parts of the area 202 of the facility so that the sensors may receive broadcast beacons from mobile devices 212 in proximity to the sensors.

Still referring to FIG. 2, the sensors 214-224 are positioned at known locations of the facility and each mobile device 212 sends a broadcast beacon to the sensors. Each sensor 214-224 will measure a receive time, i.e., measured time, of the broadcast beacon. Since each sensor 214-224 may be subject to a clock error, and since the exact time when the broadcast beacon is transmitted by the mobile device is unknown, each measured time identified by each sensor is:

$$\text{Measured\_Time} = \text{Broadcast\_Time} + \text{Sensor\_Time\_Error} + \text{Time\_of\_Flight} \quad (1)$$

where Measured_Time is associated with receipt of the broadcast beacon by the sensor, Broadcast_Time is associated with transmission of the broadcast beacon by the mobile device, Sensor_Time_Error is associated with an offset of the sensor clock from an accurate clock, and Time_of_Flight is a time taken by the broadcast beacon signal to travel from the mobile device to the sensor. Where multiple sensors receive the broadcast beacon signal, there are multiple equations in which each equation is associated with the measured time for each sensor:

$$\text{Measured\_Time}_i = \text{Broadcast\_Time} + \text{Sensor\_Time\_Error}_i + \text{Time\_of\_Flight}_i \quad (2)$$

where i is a reference number for the sensor, which numbers from 1 to the total number of sensors being considered, such as the total number of sensors receiving or in proximity to the broadcast beacon.

The accuracy of the location determining system 100 depends, in part, on the precision of the sensor components. In particular, the precision of the timing and communication circuits of the sensors may have a significant impact, so the sensor time error is important for determining the location of the mobile device. For example, one type of sensor may measure the receive time of the broadcast beacon using a nanosecond clock. If the transmission velocity is predetermined to be 30 cm per nanosecond, then the timing and communication circuits of the sensor with 1 nanosecond resolution may accomplish 30 cm accuracy of determining the location of the mobile device.

Figure 3:
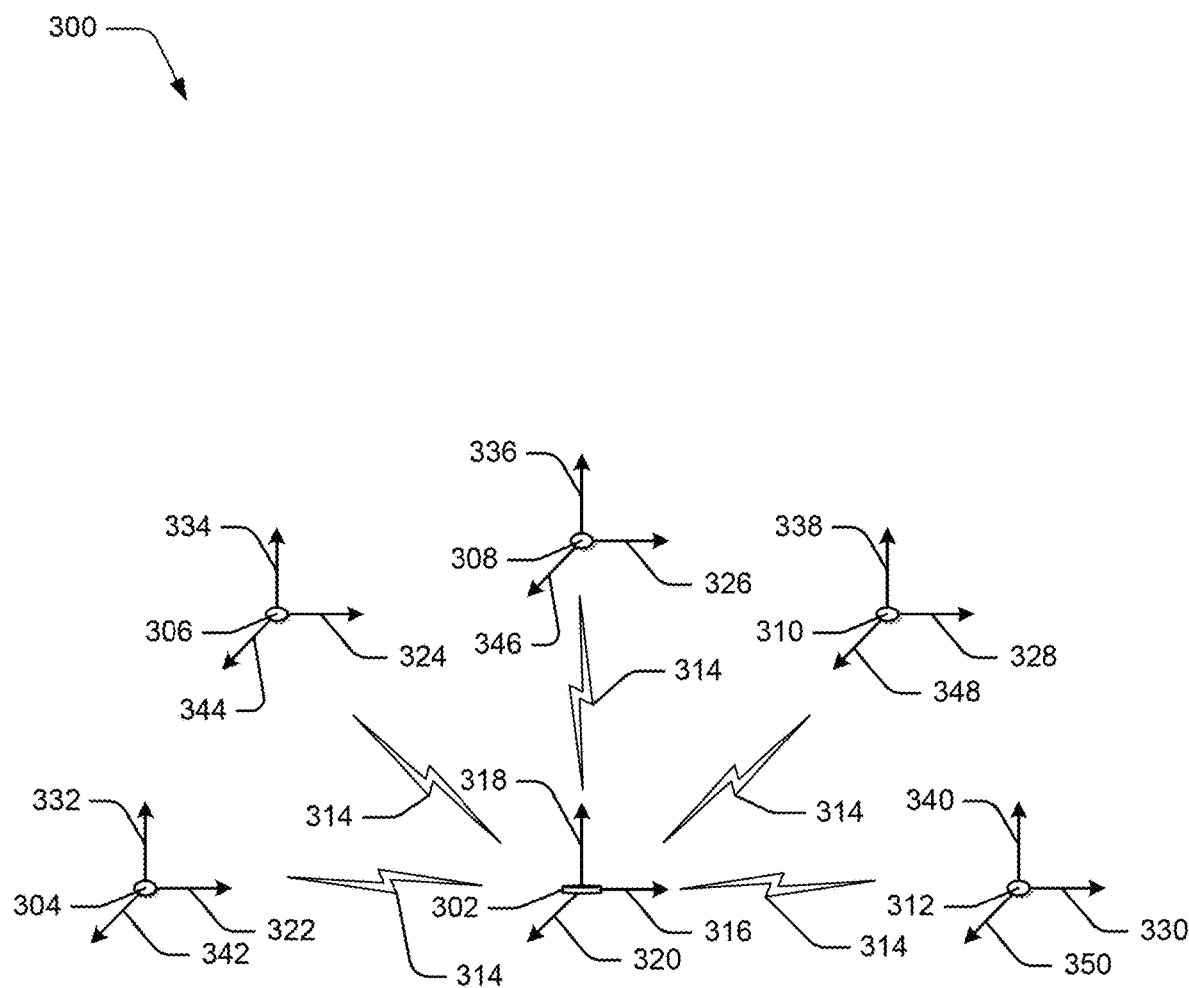
FIG. 3 is an abstract representation depicting an operational aspect of the techniques described herein.

Referring to FIG. 3, there is shown an abstract representation 300 of an aspect of the location determining system 100. It is to be understood that the abstract representation 300 does not represent an entire embodiment of the location determining system 100 since the abstract representation only illustrates one mobile device 302. Similar to the example implementation 200 of FIG. 2, the abstract representation 300 illustrates a mobile device 302 communicating with multiple sensors 304-312. The mobile device 302 transmits a beacon 314 that is broadcast about the mobile device so that the sensors 304-312 in proximity to the mobile device may receive the beacon. The location determining system 100 determines a location of the mobile device 302 at the facility in which the location is in the form of multiple dimensional coordinates. For example, the location of the mobile device 302 may include an x-coordinate 316 and a y-coordinate 318 based on two-dimensional space, or the x-coordinate 316, the y-coordinate 318, and a z-coordinate 320 based on three-dimensional space.

Each sensor 304-312 of the location determining system has a location at the facility. The location determining system 100 stores a location for each sensor 304-312 in the form of multiple dimensional coordinates. For example, the location of each sensor 304-312 may include an x-coordinate 322-330 and a y-coordinate 332-340 based on two-dimensional space, or the x-coordinate 322-330, the y-coordinate 332-340, and a z-coordinate 342-350 based on three-dimensional space.

The location determining system 100 determines the location of mobile device based on the time of flight between the mobile device and multiple known locations of the facility. In particular, time of flight may be determined from the distance and transmission velocity between the mobile device and multiple known locations of the facility since $$\text{Distance}=\text{Time}*\text{Speed} \quad (3)$$

for each instance of measuring time between each mobile device and each sensor, where Distance is the distance between the mobile device and the subject sensor, Time is the difference between the receive time and the broadcast time of the broadcast beacon plus the sensor time error, and Speed is the transmission velocity between the mobile device and the subject sensor. For purposes of determining the sensor time error of the subject sensor and the location of the mobile device, the location determining system 100 may consider the transmission velocity to be a constant value based on a general speed of electromagnetic radiation of a radio frequency wave, speed of light, or speed of sound.

The location determining system 100 may apply the above concept in a more detailed form of equation (2) above as follows:

$$\sqrt{(x_j - A_i)^2 + (y_j - B_i)^2 + (z_j - C_i)^2} = (t_{i,j} - t_0 + e_i)*c \quad (4)$$

where x, y, and z are coordinates for the location of the mobile device; A, B, and C are the coordinates for the location of the subject sensor; $t_{i,j}$ is the measured time when the sensor receives the broadcast beacon; $t_0$ is a reference time representing a broadcast time when the mobile device transmits the broadcast beacon; e is the sensor time error; and c is the transmission velocity. This concept is applied to each instance of measuring time between each mobile device identified by j and each sensor identified by i. It should be noted that clock corrections are only solving for offset since the frequency error has a very small contribution as the time involved is short.

For the abstract representation 300 shown in FIG. 3, sensor time error and the location of the mobile device 302 may be based on the distances between the mobile device and the sensors 304-312, the measured time identified by each sensor for receiving a broadcast beacon from the mobile device, and the transmission velocity which may be a predetermined constant for the location determining system 100. Thus, for a given instance, the abstract representation would represent five equations, one for each interaction between the mobile device 302 and a sensor 304-312. For example, for a first interaction between the mobile device 302 and the first sensor 304, the distance between the device and sensor may be based on the coordinates 316, 318, 320 of the mobile device and the coordinates 322, 332, 342 of the first sensor; the speed of the transmission may be based on the measured time, the reference time, and the sensor time error of the beacon transmission; and the transmission velocity may be predetermined. Similar representations may be determined for the second, third, fourth, and fifth sensors 306-312.

Figure 4:
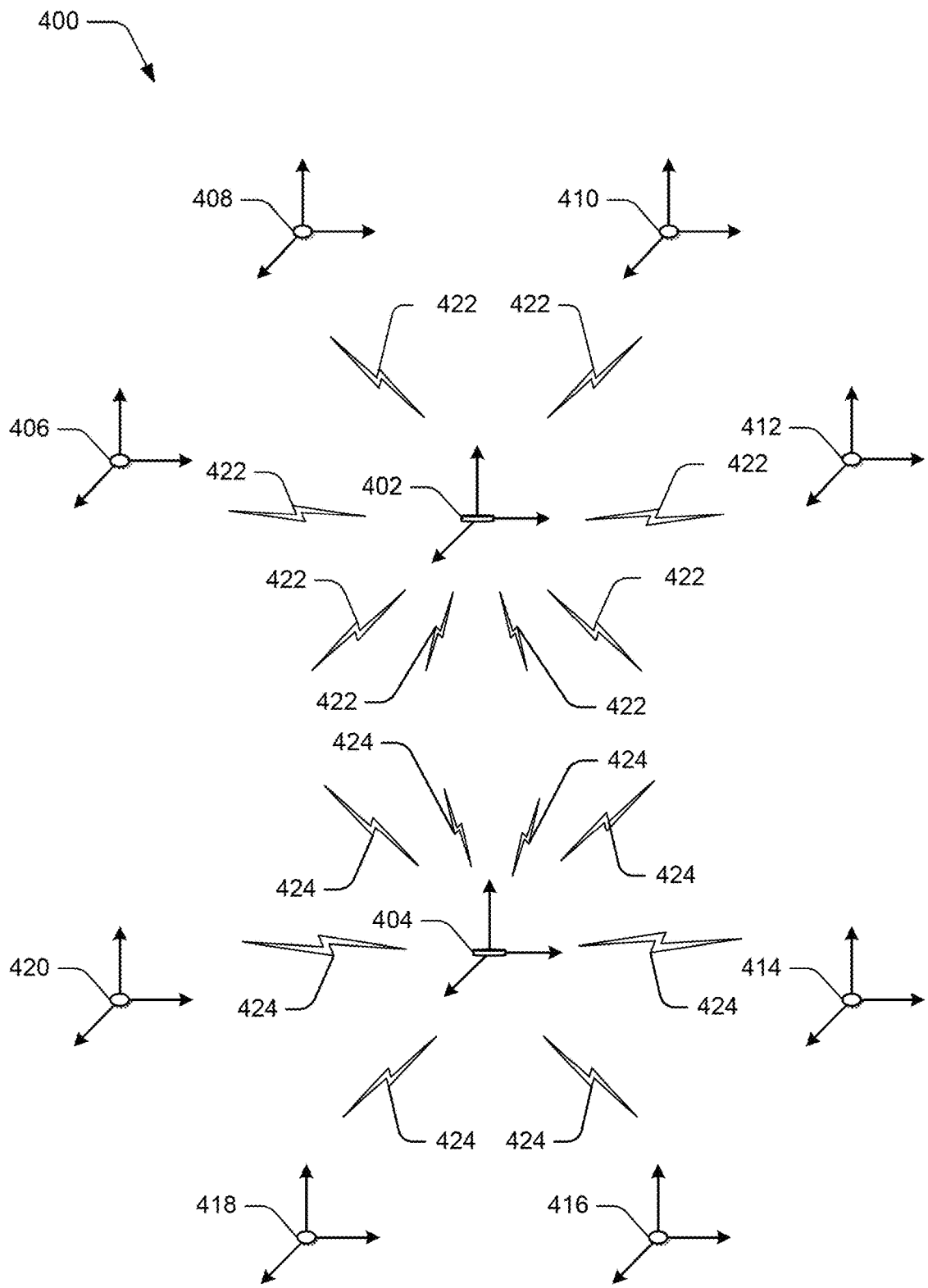
FIG. 4 is an abstract representation depicting another operational aspect of the techniques described herein.

Referring to FIG. 4, there is shown another abstract representation 400 of the location determining system 100 illustrating multiple mobile devices 402, 404, in contrast to the single mobile device 302 of the abstract representation 300 shown in FIG. 3. The abstract representation 400 of FIG. 4 illustrates a first mobile device 402 and a second mobile device 404 communicating with multiple sensors 406-420. The first mobile device 402 transmits a first broadcast beacon 422 that is broadcast about the first mobile device so that the sensors 406-420 in proximity to the first mobile device may receive the beacon. Likewise, the second mobile device 404 transmits a second broadcast beacon 424 that is broadcast about the second mobile device so that the sensors 406-420 in proximity to the second mobile device may receive the beacon. The location determining system 100 determines a first location of the first mobile device 402 and a second location of the second mobile device 404 at the facility in which each of the first and second locations is in the form of multiple dimensional coordinates. For example, each mobile device 402, 404 may include x and y coordinates based on two-dimensional space or x, y, and z coordinates based on three-dimensional space.

Similar to the first and second mobile devices 402, 404, each sensor 406-420 of the location determining system 100 has a location at the facility. For some embodiments, the location of each sensor 304-312 is in the form of multiple dimensional coordinates. For example, the location of each sensor 304-312 may include an x-coordinate 322-330 and a y-coordinate 332-340 based on two-dimensional space, or the x-coordinate 322-330, the y-coordinate 332-340, and a z-coordinate 342-350 based on three-dimensional space.

The location determining system 100, namely the sensor hub 136 of the system, determines the location of each mobile device based on known data that is predetermined or received from the sensors 406-420 and unknown data that is determined by the sensor hub based on the known data. The known data include the location of each sensor 406-420 and the transmission velocity which are stored at the sensor hub 136 as well as the measured data which is identified by and received from each sensor 406-420. The unknown data include the location of each mobile device 402, 404, the reference time representing a broadcast time when the mobile device transmits the broadcast beacon, and the sensor time error (i.e., clock correction for the sensor timing circuit).

Equations may be solved to determine the unknown data as long as the number of equations are equal to, or greater than, the number of unknowns. Thus, for the location determining system 100, the requirement for a solution is:

$$\text{num}_{devices}*\text{num}_{sensors} \geq \text{num}_{sensors} + 4*\text{num}_{devices} \quad (5)$$

wherein $\text{num}_{devices}$ represents the number of mobile devices in proximity to the sensors and $\text{num}_{sensors}$ represents the number of sensors in proximity to the mobile devices, thus receiving the broadcast beacons. The number of equations is associated with the number of sensors receiving the broadcast beacons of the mobile devices. The number of unknowns is associated with the number of sensor time errors of the sensors (one for each sensor) as well as the four unknowns associated with the mobile device (namely, the x, y, and z coordinates of the device and the reference time for broadcasting each beacon).

In determining the location of each mobile device, it is important to have a sufficient number of mobile devices and sensors in proximity to each other, e.g., in which sensors are within receiving range of the broadcast beacon, to determine the unknown data. For a single mobile device, the requirements for determining the location of the mobile device cannot be met since the number of unknowns will always exceed then number of equations by four. For multiple mobile devices, the requirements are met as long as there are a sufficient number of sensors to generate equations for determining the unknowns. Referring to equation (5) above, as the number of mobile devices increases, the number of unknowns per sensor does not increase even though the number of equations per sensor increases. Thus, for embodiments that include two mobile devices, at least eight sensors may be utilized to determine the unknowns, i.e., mobile device locations, the reference time of the broadcast beacon, and the sensor time error of the sensor. For embodiments that include three or four mobile devices, at least six sensors may be utilized to determine the unknowns. For embodiments that include more than four mobile devices, at least five sensors may be utilized to determine the unknowns. More than four sensors are needed for embodiments that include more than four mobile devices because there are four unknowns associated with each mobile device.

Further, an unattended mobile device located at a known position at the facility may be utilized by the location determining system 100 to determine sensor time error and the location of attended mobile devices so long as the unattended mobile device is in proximity of the same sensors as the attended mobile device. Thus, the mobile devices may include at least one unattended mobile device that is positioned at a particular location of the facility. The location determining system 100 requires a plurality of mobile devices and the unattended mobile device may be one of the plurality of mobile devices. Each attended mobile device must be associated with an occupant of the facility but any unattended mobile device may or may not be associated with an occupant. Also, each attended mobile device must be mobile in order to represent an occupant's location at any given time, but any unattended mobile device may be stationary or mobile.

Figure 5:
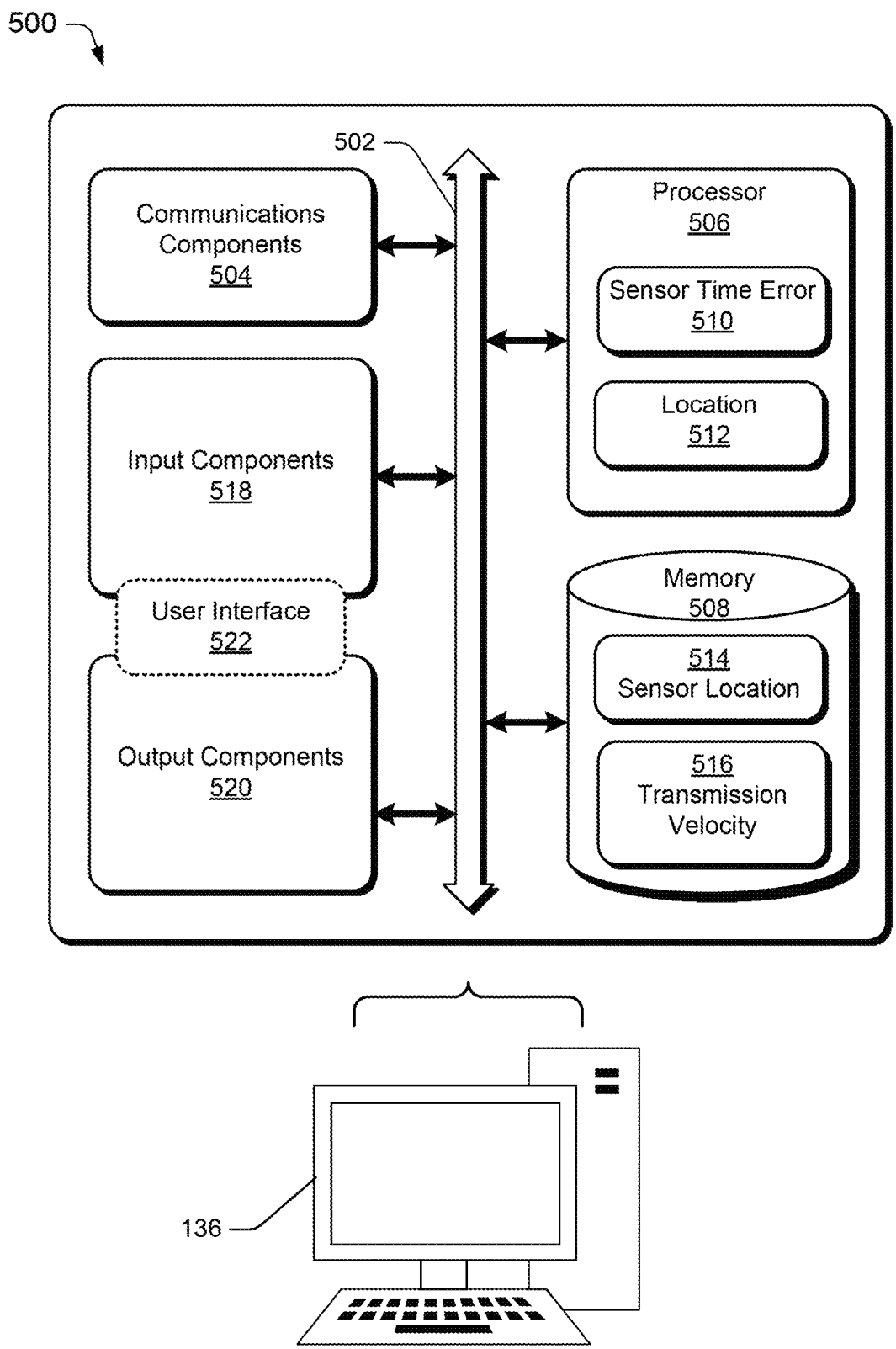
FIG. 5 is a block diagram of an example implementation of the sensor hub of FIG. 1.

Referring to FIG. 5, there is shown a block diagram of example device components 500 of the sensor huh 136 of the location determination system 100. The sensor hub 136 may be a server, a workstation, a remote device, or other type of device for management and control of one or more aspects of the location determining system 100. The device components 500 of the sensor hub 136 comprise a communication bus 502 for interconnecting the other device components directly or indirectly, one or more communication components 504 communicating other entities via a wired or wireless network, one or more processors 506, and one or more memory components 508. The communication component 504 of the device components 500 may utilize wired technology for communication, such as transmission of data over a physical conduit, e.g., an electrical cable or optical fiber cable. The communication component 504 may utilize, in addition to or in the alternative, wireless technology for communication, such as, but are not limited to, satellite-based and cellular-based communications and their variants as well as wireless local area network (WLAN) communication and their variants, such as infrastructure, peer-to-peer, ad hoc, bridge, and wireless distribution-based communications.

The processor 506 may execute code and process data received other components of the device components 500, such as information received at the communication component 504 or stored at the memory component 508. The code associated with the location determining system 100 and stored by the memory component 508 may include, but is not limited to, operating systems, applications, modules, drivers, and the like. An operating system includes executable code that controls basic functions of the sensor hub 136, such as interactions among the various components of the device components 500, communication with external devices via the communication component 504, and storage and retrieval of code and data to and from the memory component 508. Each application includes executable code to provide specific functionality for the processor 506 and/or remaining components of the sensor hub 136. Examples of applications executable by the processor 506 include, but are not limited to, a sensor time error application to determine the time error for each sensor and a location application to determine the location of each mobile device at the facility. Data is information that may be referenced and/or manipulated by an operating system or application for performing functions of the sensor huh 104. Examples of data associated with the location determining system 100 and stored by the memory component 508 may include, but are not limited to, location data associated with the location at the facility of each sensor and transmission velocity data associated with the anticipated speed of the broadcast beacon for travelling between the mobile device and each sensor. Examples of constant values that may be used as the basis for the transmission velocity include, but are not limited to, a general speed of electromagnetic radiation of a radio frequency wave, speed of light, or speed of sound.

The device components 500 of each sensor hub 136 may further comprise one or more input and/or output components (I/O interfaces) 518, 520. The I/O interfaces 518, 520 of the device components 500 may include a variety of video, audio, and/or mechanical components. The I/O interfaces 518, 520 of each sensor hub 136 may comprise a user interface 522 for interaction with a user, such as a technician, of the sensor hub. The user interface 522 may include a combination of hardware and software to provide a user with a desired user experience. For example, the user interface 522 may include one or more input components 518 to allow the user to enter information and one or more output components 520 to provide information to the user. Although the user interface 522 may include all input components 518 and all output components 520 of the I/O interface, the user interface may also be directed to a specific subset of input components and/or output components. The I/O interfaces 518, 520 may further include one or more controllers to manage sensor data received directly or indirectly from the sensors. Examples of the sensor data managed by the controller or controllers include, but are not limited to, lighting, motion, temperature, imaging, and air quality data associated with each sensor.

The device components 500 may further comprise a power source, such as a power supply or a portable battery, for providing power to the other device components 500 of each sensor hub 136 of the location determining system TOO.

It is to be understood that FIG. 5 is provided for illustrative purposes only to represent examples of the device components 500 of a sensor hub 136 and is not intended to be a complete diagram of the various components that may be utilized by the device. Therefore, sensor hub 136 may include various other components not shown in FIG. 5, may include a combination of two or more components, or a division of a particular component into two or more separate components, and still be within the scope of the present invention.

Figure 6:
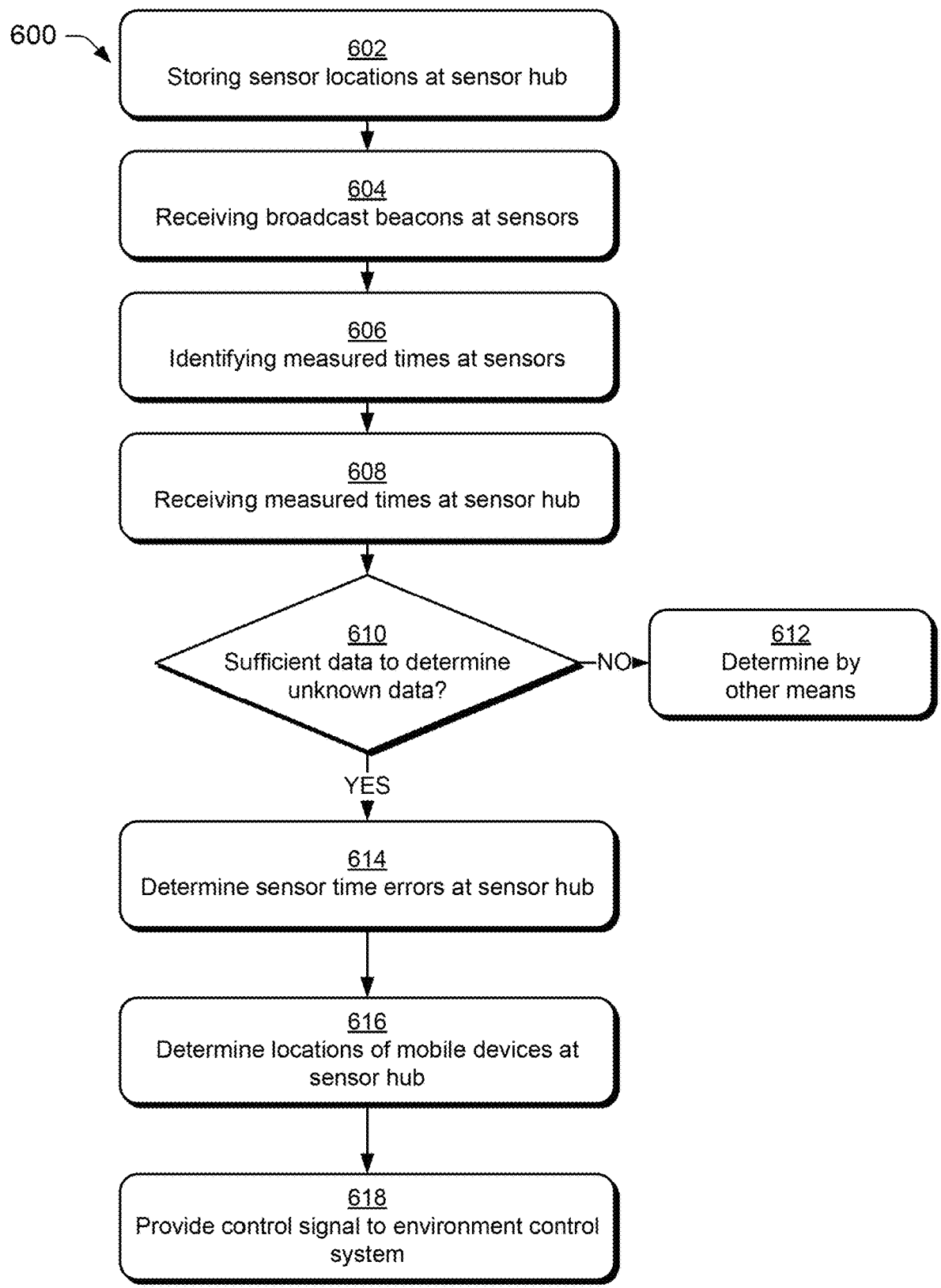
FIG. 6 is a flow diagram representing an example operation that is operable to employ the techniques described herein.

Referring to FIG. 6, there is shown a flow diagram representing an example operation that is operable to employ the techniques described herein for the location determining system 100. For the method of the location determining system, the sensor hub 136 stores 602 the locations of the sensors 514, such as multi-dimensional coordinates for each sensor of located at the facility. The sensor locations 514 may be stored at the memory component 508 of the sensor hub 136.

When mobile devices 112, 114 traverses some of the sensors of the facility, the sensors in proximity to the mobile devices receive 604 a particular broadcast beacon from each particular mobile device. At least one mobile device must be an attended mobile device associated with a particular occupant but, optionally, one or more other mobile devices may be an unattended mobile device that is positioned at a particular location of the facility. In response to receiving 604 the broadcast beacon, each sensor may identify 606 a measured time associated with receipt of the broadcast beacon. Each sensor may then transmit the measured time associated with receipt of the broadcast beacon to the sensor hub 136.

The sensor hub 136 may receive 608 measured times from the sensors, in which a particular measured time is received from each sensor. For some embodiments, the sensor hub 136 may determine 610 whether the determined number of sensors and the determined number of mobile devices is great enough to allow for determination of a location for each mobile device. For some other embodiments, the sensor hub 136 may further determine 610 whether the determined number of sensors and the determined number of mobile devices is great enough to allow for determination of a broadcast time for each broadcast beacon and determination of a sensor time error for each sensor, as well as determination of a location for each mobile device. If the sensor hub 136 determines that the number of sensors and mobile devices are insufficient, then the sensor hub 136 determine 612 the desired information by some other means (whether inferior or not) or perform an action that does not require determination of the desired information. For yet other embodiments, the sensor hub 136 may proceed with determining the desired information in response to receiving 608 measured times without determining whether the number of sensors and mobile devices are insufficient.

The sensor hub 136 of the location determining system 100 may determine 614 the sensor time error for each sensor based on the measured times received 608 from the sensors as well as the sensor locations 514 and transmission velocity 516 stored at the memory component 508. In determining the sensor time errors, the sensor hub 136 may determine a time of flight for each broadcast beacon based on a particular location of the corresponding sensor receiving the broadcast beacon, a particular location of the mobile devices transmitting the broadcast beacon, and the transmission velocity. The transmission velocity may be based on a constant value such as, but not limited to, a speed of electromagnetic radiation, a speed of light, and a speed of sound.

The sensor hub 136 of the location determining system 100 may further determine 616 locations corresponding to the mobile devices based at least in part on the sensor time errors. In addition, the sensor hub 136 may further provide 618 one or more control signals to an environment control system 144 of the facility. The environment control system 144 may manage an environmental condition of the facility based at least in part on the locations corresponding to the mobile devices.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A location determining system comprising:
   a plurality of mobile devices;
   a plurality of sensors having a plurality of locations at a facility, the plurality of sensors receiving a plurality of broadcast beacons from the plurality of mobile devices, the plurality of sensors identifying a plurality of measured times associated with receipt of the plurality of broadcast beacons; and
   a sensor hub communicating directly or indirectly with the plurality of sensors, the sensor hub storing the plurality of locations of the plurality of sensors, receiving the plurality of measured times from the plurality of sensors, and the sensor hub determining a plurality of sensor time errors based on the plurality of measured times, the plurality of locations of the plurality of sensors, and a transmission velocity associated with the plurality of broadcast beacons,
   wherein the sensor hub determines a particular sensor time error for each sensor of the plurality of sensors based on a particular measured time of the corresponding sensor, a particular location of the corresponding sensor, and the transmission velocity associated with the plurality of broadcast beacons.

2. The location determining system as described by claim 1, wherein the sensor hub stores multi-dimensional coordinates for each sensor of the plurality of sensors located at the facility.

3. The location determining system as described by claim 1, wherein:
each sensor of the plurality of sensors receives a particular broadcast beacon of the plurality of broadcast beacons from a particular mobile device of the plurality of mobile devices.

4. The location determining system as described by claim 1, wherein the plurality of mobile devices include the at least one unattended mobile device that is positioned at a particular location of the facility.

5. The location determining system as described by claim 1, wherein each sensor of the plurality of sensors identifies a particular measured time of the plurality of measured times that is associated with receipt of each broadcast beacon by the plurality of broadcast beacons.

6. The location determining system as described by claim 1, wherein the sensor hub determines a time of flight for each broadcast beacon of the plurality of broadcast beacons based on the particular location of the plurality of locations of the corresponding sensor, a particular location of the plurality of mobile devices transmitting the broadcast beacon, and the transmission velocity associated with the plurality of broadcast beacons.

7. The location determining system as described by claim 1, wherein the transmission velocity is based on a constant value selected from the group consisting of speed of electromagnetic radiation, speed of light, and speed of sound.

8. The location determining system as described by claim 1, wherein:
the sensor hub provides a control signal to an environment control system of the facility; and
the environment control system manages an environmental condition of the facility based at least in part on the plurality of locations corresponding to the plurality of mobile devices.

9. A location determining system comprising:
a plurality of mobile devices;
a plurality of sensors having a plurality of locations at a facility, the plurality of sensors receiving a plurality of broadcast beacons from the plurality of mobile devices, the plurality of sensors identifying a plurality of measured times associated with receipt of the plurality of broadcast beacons; and
a sensor hub communicating directly or indirectly with the plurality of sensors, the sensor hub storing the plurality of locations of the plurality of sensors, receiving the plurality of measured times from the plurality of sensors, and the sensor hub determining a plurality of sensor time errors based on the plurality of measured times, the plurality of locations of the plurality of sensors, and a transmission velocity associated with the plurality of broadcast beacons,
wherein the sensor hub determines a plurality of locations corresponding to the plurality of mobile devices based at least in part on the plurality of sensor time errors.

10. A method for a location determining system comprising:
storing, at a sensor hub, a plurality of locations of a plurality of sensors located at a facility;
receiving, at the plurality of sensors, a plurality of broadcast beacons from a plurality of mobile devices;
identifying, at the plurality of sensors, a plurality of measured times associated with receipt of the plurality of broadcast beacons by the plurality of sensors;
receiving, at the sensor hub, the plurality of measured times from the plurality of sensors; and
determining, at the sensor hub, a plurality of sensor time errors based on the plurality of measured times, the plurality of location of the plurality of sensors, and a transmission velocity associated with the plurality of broadcast beacons, wherein determining the plurality of sensor time errors includes determining a particular sensor time error for each sensor of the plurality of sensors based on a particular measured time of the corresponding sensor, a particular location of the corresponding sensor, and the transmission velocity associated with the plurality of broadcast beacons.

11. The method as described in claim 10, wherein storing the plurality of locations for the plurality of sensors located at the facility includes storing multi-dimensional coordinates for each sensor of the plurality of sensors located at the facility.

12. The method as described in claim 10, wherein receiving the plurality of broadcast beacons from the plurality of mobile devices includes receiving, by each sensor of the plurality of sensors, a particular broadcast beacon of the plurality of broadcast beacons from a particular mobile device of the plurality of mobile devices.

13. The method as described in claim 10, wherein the plurality of mobile devices include the at least one unattended mobile device that is positioned at a particular location of the facility.

14. The method as described in claim 10, wherein identifying the plurality of measured times associated with receipt of the plurality of broadcast beacons by the plurality of sensors includes identifying each measured time of the plurality of measured times that is associated with receipt of each broadcast beacon of the plurality of broadcast beacons by a particular sensor of the plurality of sensors.

15. The method as described in claim 10, wherein determining the plurality of sensor time errors includes determining a time of flight for each broadcast beacon of the plurality of broadcast beacons based on the particular location of the corresponding sensor, a particular location of the plurality of mobile devices transmitting the broadcast beacon, and the transmission velocity associated with the plurality of broadcast beacons.

16. The method as described in claim 10, wherein the transmission velocity is based on a constant value selected from the group consisting of speed of electromagnetic radiation, speed of light, and speed of sound.

17. A method for a location determining system comprising:
storing, at a sensor hub, a plurality of locations of a plurality of sensors located at a facility;
receiving, at the plurality of sensors, a plurality of broadcast beacons from a plurality of mobile devices;
identifying, at the plurality of sensors, a plurality of measured times associated with receipt of the plurality of broadcast beacons by the plurality of sensors;
receiving, at the sensor hub, the plurality of measured times from the plurality of sensors;
determining, at the sensor hub, a plurality of sensor time errors based on the plurality of measured times, the plurality of location of the plurality of sensors, and a transmission velocity associated with the plurality of broadcast beacons; and
determining, at the sensor hub, a plurality of locations corresponding to the plurality of mobile devices based at least in part on the plurality of sensor time errors.

18. The method as described in claim 17, further comprising providing a control signal to an environment control system of the facility, wherein the environment control system manages an environmental condition of the facility based at least in part on the plurality of locations corresponding to the plurality of mobile devices.

* * * * *